(12) United States Patent
Sharma et al.

(10) Patent No.: US 12,455,912 B1
(45) Date of Patent: Oct. 28, 2025

(54) AIRCRAFT HARDWARE COMPONENT ROTABILITY CLASSIFICATION USING MACHINE LEARNING

(71) Applicant: CAMP Systems International, Inc., Merrimack, NH (US)

(72) Inventors: Shivam Sharma, Memphis, TN (US); James E. Allman, Jr., Memphis, TN (US); Sean M. Lanagan, Concord, MA (US); John P. Herrman, Eads, TN (US); Heather O. Levesque, New Brunswick (CA)

(73) Assignee: CAMP Systems International, Inc., Merrimack, NH (US)

( * ) Notice: Subject to any disclaimer, the term of this patent is extended or adjusted under 35 U.S.C. 154(b) by 0 days.

(21) Appl. No.: 18/884,418

(22) Filed: Sep. 13, 2024

(51) Int. Cl.
*G06F 16/30* (2019.01)
*G06F 16/31* (2019.01)
*G06F 16/334* (2025.01)
*G06F 16/353* (2025.01)
*G06F 30/27* (2020.01)
*G06N 5/04* (2023.01)
*G06N 20/00* (2019.01)

(52) U.S. Cl.
CPC ........ *G06F 16/3347* (2019.01); *G06F 16/316* (2019.01); *G06F 16/353* (2019.01); *G06F 30/27* (2020.01); *G06N 5/04* (2013.01); *G06N 20/00* (2019.01)

(58) Field of Classification Search
CPC .. G06F 16/316; G06F 16/3347; G06F 16/353; G06F 30/27; G06N 5/04; G06N 20/00
See application file for complete search history.

(56) References Cited

U.S. PATENT DOCUMENTS

| 10,878,567 | B1 * | 12/2020 | Abid | A61B 5/7267 |
| 2012/0033850 | A1 * | 2/2012 | Owens | G06Q 10/08 382/190 |
| 2020/0241986 | A1 * | 7/2020 | Liao | G06F 11/2263 |
| 2023/0377047 | A1 * | 11/2023 | Bouëtté | G06V 10/82 |

* cited by examiner

*Primary Examiner* — Diedra McQuitery
(74) *Attorney, Agent, or Firm* — Fenwick & West LLP

(57) ABSTRACT

An application extracts a plurality of features of a hardware component of an aircraft. The application inputs a first subset of features of the plurality of features into a first machine learning model, and receives as output a first determination of whether the hardware component is rotable. The application inputs a second subset of features of the plurality of features into a second machine learning model, and receives as output a second determination of whether the hardware component is rotable. The applications determines, based on the first determination and the second determination, a final determination of whether the hardware component is rotable, and adds a data structure for the hardware component with the final determination in a searchable database. The application receives a query from a user that is associated with the hardware component, runs a search, outputs whether the hardware component is rotable.

20 Claims, 7 Drawing Sheets

AIRCRAFT HARDWARE COMPONENT ROTABILITY CLASSIFICATION USING MACHINE LEARNING

TECHNICAL FIELD

The disclosure generally relates to the field of machine learning, and more particularly relates to rotability classification of aircraft hardware components.

BACKGROUND

Aircraft hardware components may be rotable or consumable, where rotable components can be repaired and re-used on aircraft, and consumable components are discarded after a single use. Whether a component is rotable or consumable is not typically listed by original equipment manufacturer specifications, and data tends to be opaque on rotability of a given component. Given the opacity and inconsistency of the data, training examples do not exist that map signals to determinations of rotability, therefore impeding the ability of developing a supervised classifier to draw determinations of rotability of any given aircraft hardware component.

SUMMARY

Systems and methods are disclosed herein for training, deploying, and harmonizing multiple rotability classifiers based on different historical signals for aircraft components, thereby enabling a robust prediction of whether a given aircraft component is rotable. Rotability may be indicated for searched aircraft components, resulting in an improved user interface with improved data resolution during aircraft component searches.

In some embodiments, an application extracts a plurality of features of a hardware component of an aircraft. Different subsets of features are input into respective different rotability classifiers. The application harmonizes the outputs from the rotability classifiers to obtain a final determination of whether the hardware component is rotable. The application adds a data structure for the hardware component with the final determination in a searchable database and includes rotability indications with search results for aircraft hardware components.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment of Hardware Component Service

Figure 1:
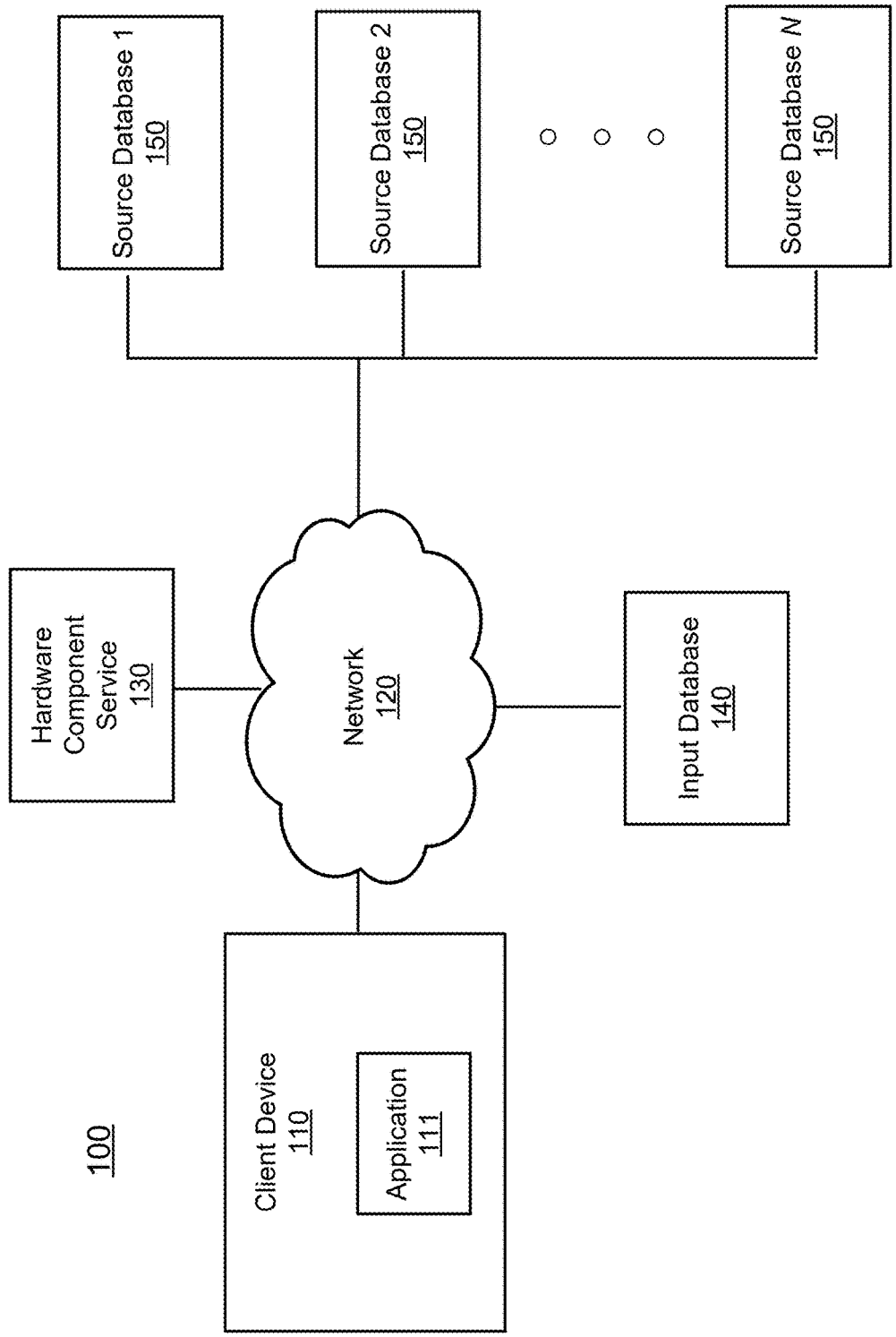
FIG. 1 illustrates one embodiment of a system environment for operating a hardware component service.

FIG. 1 illustrates one embodiment of a system environment 100 for operating a hardware component service. As depicted in FIG. 1, environment 100 includes client device 110 with application 111 installed thereon, network 120, hardware component service 130, input database 140, and source databases 150. Client device 110 may be any device configured to receive input from a user and communicate with aircraft component service 130 and/or input database 140. Exemplary client devices include personal computers, smartphones, tablets, Internet-of-Things (IoT) devices, laptops, kiosks, and so on. Communications between client device 110 and hardware component service 130 and/or input database 140 may be managed by application 111.

Application 111 may be a specialized application (e.g., downloaded from hardware component service 130 or provided by aircraft component service 130 for download through a third-party system), or may be accessed through a browser installed on client device 110. Application 111 may be used to enter a search query relating to a hardware component.

Network 120 may be any network that transmits data communications between at least client device 110 and hardware component service 130. Network 120 may transmit data communications between any entity shown in FIG. 1, as well as any entity discussed herein but not shown in FIG. 1. Exemplary data networks include the Internet, a wide area network, a local area network, a WiFi network, and any other network that transfers data between electronic devices.

Hardware component service 130 uses both historical and new data entries relating to hardware components to generate a searchable database (e.g., input database 140). Hardware component service 130 may be driven by a machine learning model (or multiple models). Further details about hardware component service 130 are described with reference to FIGS. 2 and 4 below.

Input database 140 stores one or more searchable databases generated by hardware component service 130. Hardware component service 130 may search input database 140 responsive to receiving a query (e.g., from client device 110) relating to a given hardware component. While depicted as a separate entity from hardware component service 130, input database 140 may be stored within the boundaries of hardware component service 130. Source databases 150 house data (e.g., historical and new data entries) relating to hardware components and provide this data to hardware component service 130.

Exemplary Particulars of Hardware Component Service

Figure 2:
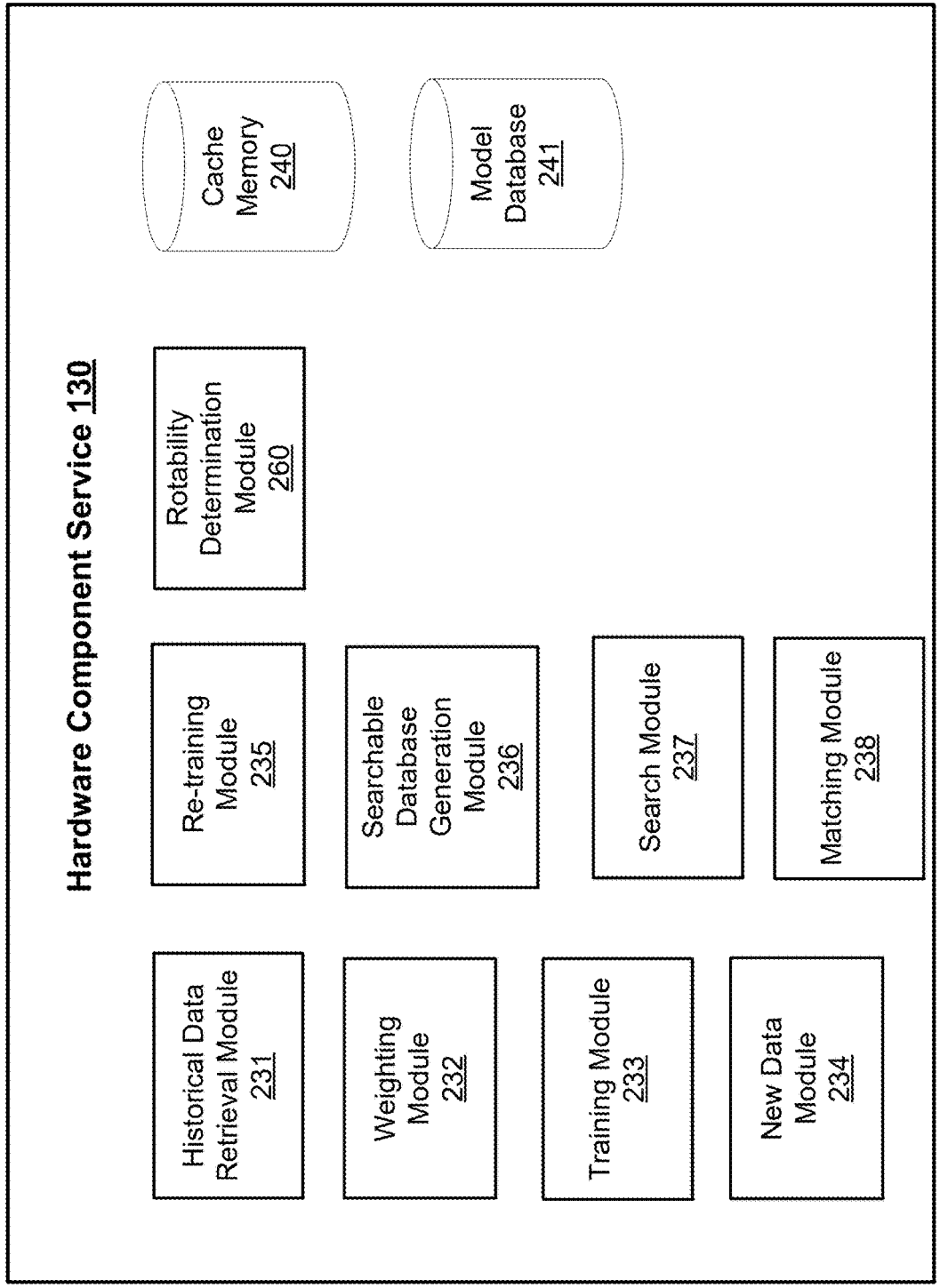
FIG. 2 illustrates one embodiment of exemplary modules and databases used by the hardware component service.

FIG. 2 illustrates one embodiment of exemplary modules and databases used by the hardware component service 130. As depicted in FIG. 2, hardware component service 130 includes historical data retrieval module 231, weighting module 232, training module 233, new data module 234, re-training module 235, searchable database generation module 236, search module 237, matching module 238, cache memory 240, model database 241, and rotability determination module 260. The modules and databases depicted in FIG. 2 are merely exemplary; fewer or more modules and/or databases may be used to achieve the functionality described herein. Moreover, some or all functionality of hardware component service 130 may be distributed and/or instantiated at client device 110 (e.g., on application 111), at one or more of the source databases 150, at input database 140, or any combination thereof.

Historical data retrieval module 231 retrieves historical data from any number of databases (e.g., source databases 150). The historical data includes entries that reference both a particular airplane hardware component, and a value associated therewith. Historical data retrieval module 231 may identify source databases 150 through any known means, such as scraping web data having references to known hardware components. The references to known hardware components may be any identifying feature of a hardware component, such as a name, model number, serial number, or any other identifier. Historical data may include any data referencing any known hardware component, regardless of whether it is old data (e.g., 50 or more years old), inaccurate data, or from sources that are disreputable (e.g., based on internally calculated or third-party calculated trust scores relating to the sources).

Historical data retrieval module 231 may store the retrieved historical data in cache memory 240. Cache memory 240 may be any memory that stores readily-retrievable data, as distinguished from non-cache memory which stores data having latency that cannot be accessed in less than a given threshold amount of time. Cache memory 240 may be stored on one or more servers of hardware component service 130 and/or may be in whole or in part stored using a third-party service.

Weighting module 232 determines weights to apply to values corresponding to hardware components as indicated in each entry of the historical data. In an embodiment, weights may be applied based on heuristics, where the heuristics together are referred to as a weighting model. For example, anomalies and attenuation signals may be pre-defined. The term anomaly, as used herein, may refer to an artifact within a data entry that, if found, causes the data entry to be discarded or fully discounted to a zero weight or a de minimus weight. The term attenuation signal, as used herein, may refer to an artifact within a data entry that, if found, causes the data entry to be discounted—that is, weighted to less than a normal unit of weight.

Anomalies and attenuation signals may be defined by an administrator or user of the system. An amount to discount an entry having an anomaly and/or an attenuation signal, or whether to discard a data entry having an anomaly, may be pre-defined by an administrator or user of hardware component service 130. An exemplary anomaly may be a data entry having an artifact indicative of a source that is known to be fraudulent. Another exemplary anomaly may be a cut-off age where historical data is considered to not be useful (e.g., more than 50 years old). Exemplary attenuation signals may include age (e.g., where certain age ranges of an entry relative to a present time may each be corresponded to a respective discount amount), source (e.g., where different sources have different discount amounts, or no discount amount), and so on.

In an embodiment, a data entry may have more than one artifact corresponding to an anomaly or an attenuation. In such an embodiment, weighting module 232 may discount the data entry based on any or a combination of an artifact corresponding to a largest discount and/or an aggregate of all discounts corresponding to all artifacts within the data entry. In an embodiment, artifacts may be defined by a user or administrator that correspond to a positive signal. The administrator may define an amount of positive weighting that is applied where such artifacts are found in a manner opposite to that of an attenuation signal. Together, the heuristics performed by weighting module 232 may be stored in a data structure and may be collectively referred to as weighting model.

In an embodiment, weighting module 232 may apply some or all of each respective data entry of the historical data into a machine-learned model. The machine-learned model may output a weight. The machine-learned weighting model may be a supervised model or an unsupervised model. Where a supervised model is used, the machine-learned model may be trained using training data having a set of one or more artifacts, where the set is paired with a label representing a weight corresponding to the training data. Thus, the machine-learned model may match each input data entry to a weight based on the training data.

Where an unsupervised model is used, the weighting model may cluster inputs for respective hardware components based on their respective values. The weighting model may determine to not discount values that correspond to clusters, but may determine to discount outlier values that do not fall into clusters. An amount of discount may vary based on distance from a given cluster. A machine-learned model used for weighting in either manner may be referred to herein as a weighting model.

In an embodiment, two or more weighting models may be used. For example, weighting module 232 may determine whether any given data entry of the historical data is suitable for input into the machine-learned weighting model, where suitability may be pre-defined as having pre-defined parameters, such as a pre-defined set of artifacts. As another example, weighting module 232 may determine suitability based on whether at least a threshold number of the artifacts within a given data entry match at least a threshold number of artifacts known to be within the training data by which weighting module 232 was trained, where a sufficient match yields a determination of suitability. Where suitability is determined, weighting module 232 may apply the data entry to the machine-learned weighting model. Where suitability is determined to not exist, weighting module 232 may apply the data entry to a heuristic-driven weighting model. A technical advantage in such a hybrid weighting model system is that accuracy is maximized based on selective use of heuristics versus a machine-learned model. Moreover, applying heuristics is more processor-intensive than applying an entry to a machine-learned model, and thus reducing heuristics to scenarios where a machine-learned weighting model reduces the overall computational power required in determining weightings.

Regardless of whether a machine-learned model, a heuristic model, or a hybrid model is used, in an embodiment, the weighting model may consider data entries in an aggregate form when determining weighting. For example, the weighting model may determine how many data entries of the historical data (e.g., optionally filtering out data entries having anomalies first) relate to a given hardware component. The weighting model may determine not to apply a weight (or to apply a weight of one, thus causing no change) for a value of any data entry corresponding to a hardware component that has fewer than a threshold minimum of corresponding entries in the historical data.

Training module 233 trains a database generation model by using the weights determined by weighting module 232 as applied to the historical data. Training module 233 generates training data by taking an identifier of the hardware component corresponding to each entry of the historical data and pairing it with a label that matches the value indicated in the data entry. Training module 233 applies the weight to the training data, such that, for a given hardware component, the amount of weight any given training data will be given in terms of its value as a source of ground truth is discounted or augmented based on the weight applied thereto. Training module 233 trains the database generation model to take a hardware component identifier as input and to output a corresponding value using the generated training data.

In an embodiment, new data module 234 receives new data also having a hardware component and a respective value. The term new data, as used herein, may refer to data entries having hardware components and respective values that are received by hardware component service 130 after the initial training is performed using the historical data. New data module 234 may continue to receive new data and may batch the new data until a predefined condition is reached. Exemplary predefined conditions may include a threshold amount of new data has been batched, a predefined amount of time has elapsed since a reference point (e.g., a first new data of a batch being received, an interval of time has passed since a last re-training, etc.), and so on. Responsive to determining that the predefined condition has been reached, new data module 234 may determine that the database generation model is to be re-trained.

Re-training module 235 re-trains the database generation model by determining weights for each new data entry using weighting module 232 as applied to the new data. Re-training module 235 then generates new training data in the same manner training module 233 generated training data from the historical data entries. Re-training module 235 then trains the database generation model on the basis of the training data from all historical data (e.g., including any new data from prior re-training sessions) and on the basis of the training data from the new data. In an embodiment, the training data from all historical and new data is pooled and the database generation model is trained on the aggregate pool. Advantageously, in such an embodiment, weighting need not be re-performed on the historical data, as weights may be stored and retrieved for re-training purposes, thus reducing processing power required.

In an embodiment, retrieval of historical data is selectively performed depending on whether new types of data and/or signals form part of the new data. For example, re-training module 235 may determine whether the new training data includes signals and/or data types that were not considered when the database generation model was trained. Responsive to determining that the new training data includes new data types and/or signals, re-training module 235 may generate the aggregate pool using the historical data (e.g., to ensure data relating to that type and/or signal is extracted from the historical data). However, responsive to determining that the new training data does not include new data types and/or signals, re-training module 235 may use the new data without the historical data to re-train the database generation model, modifying existing associations within the database generation model based on the new data. Similarly, where the new training data does not include new data types and/or signals, re-training module 235 may extract from the last (most recent) version of the searchable data structure values for given hardware types, and may generate training data therefrom that labels the hardware type with the value. This may be performed in place of retrieving the historical data, and may be used in conjunction with the new training data to re-train the database generation model. These manners of selectively retrieving the historical data improve on memory and bandwidth efficiency in avoiding retrieval of historical data unless it is necessary.

Searchable database generation module 236 generates a searchable database of hardware components as mapped to other parameters, such as a rotability determinations (e.g., from the rotability determination module 260) and/or one or more values associated with those hardware components. Searchable database generation module 236 may generate the searchable database responsive to detecting a trigger. The term trigger, as used herein in this context, may refer to any predefined condition that causes searchable database generation module 236 to generate the searchable database. Exemplary triggers include predefined timing conditions (e.g., a threshold amount of time has passed since a last database generation and/or since a reference time (e.g., amount of time since a most recent new data has been received), a threshold amount of new data has been received since a last generation, and so on). A trigger may also be a command manually entered by a user or an administrator. When searchable database generation module 236 generates the searchable database, a prior version may be replaced (e.g., deleted) by the newly generated version, or the prior version may be stored to memory for reference at a later time.

In some embodiments, searchable database generation module 236 receives output from rotability determination module 260 for hardware components and generates a searchable data structure from the output. Additionally, or alternatively, searchable database generation module 236 takes the known hardware component identifiers from a prior searchable database and inputs those into the trained database generation model. The trained database generation model outputs the hardware component identifiers as mapped to their respective values and optionally other information. The other information may include a confidence value that the respective value for a given hardware component is correct. The other information may include any other information relating to the hardware component (e.g., a rotability determination, expected time to obtain component, expected amount of time between replacements (e.g., if the component is a consumable), expected amount of time to repair (e.g., if the component is rotable), components that may be used to repair the component (e.g., if the component is rotable), identification of similar components, and so on). Database generation module 236 may generate a searchable data structure from the output of the trained database generation model as indexed by hardware component. The searchable data structure may be the same or a different structure as the structure that maps output from rotability determination module 260 with hardware components.

In an embodiment, responsive to detecting a trigger, database generation module 236 determines whether there is new data to be synthesized prior to generating the searchable data structure. For example, where the trigger is time-based (rather than based on new data being detected), database generation module 236 may determine responsive to detecting the trigger whether there is new data to be synthesized. Where there is no new data, database generation module 236 may refrain from generating the searchable data structure. This has the technical advantage of improving processing power efficiency, as re-building the searchable database is not needlessly performed where no changes are to be made.

Search module 237 receives a query from a user comprising an indicated hardware component. The manner in which the query is generated is described in further detail with respect to FIG. 3. Search module 237 searches the searchable database for a result matching the query, e.g., by searching for an entry in the searchable database having a hardware component identifier matching the indicated hardware component. Search module 237 outputs a result comprising a rotability determination for the indicated hardware component. Optionally, search module 237 also outputs a confidence that the rotability determination is correct. In some embodiments, search module 237 outputs a result comprising a value for the indicated hardware component. Optionally, search module 237 also outputs a confidence that the value is correct. The confidence value may be determined based on a variance of values in the training data. The confidence value may be determined based on a recency, variance of values, and volume in the training data. For example, the training data may be labeled with recency values, and the model may lower confidence where recency is farther out or may lower confidence by a predefined amount corresponding to age as mapped to a deprecation of confidence.

Cache memory 240 stores data for fast access by hardware component service 130. Fast access is distinguished from slow access, where data is stored in memory remote from hardware component service 130 (e.g., a remote server) or in slower read memory that takes longer to obtain. In an embodiment, historical data (and subsequently, new data) is initially stored in cache memory 240 when received until it is used by weighting module 232 and/or training module 233, and then it is removed from the cache memory 240 (e.g., by deleting the data or moving it to slow access memory). Model database 241 stores models that the hardware component service 130 uses, including weighting models and database generation models.

The rotability determination module 260 determines whether a hardware component is rotable or consumable. As previously described, rotable hardware components can be repaired and re-used on aircraft (e.g., subject to passing inspections and/or regulatory approval), and consumable hardware components are discarded after a single use. Example rotable hardware components include landing gear assemblies, avionics equipment, and engine components. Example consumable hardware components include nuts, bolts, screws, washers, gaskets, and lubricants. A classification for a hardware component output from rotability determination module 260 may be referred to as a "rotability determination." As previously described, searchable databases generated by searchable database generation module 236 can include rotability determinations mapped to hardware component identifiers. For example, searchable database generation module 236 can receive or retrieve a set of rotability determinations when generating a searchable database. Additionally, or alternatively, searchable database generation module 236 can update or modify a previously generated searchable database to include mappings between hardware components and rotability determinations. Rotability determination module 260 is further described with respect to FIGS. 4-5 and 7.

Alternative or additional embodiments are possible based on the modules described above. In an embodiment, historical data retrieval module 231 retrieves historical data from a plurality of source databases (e.g., source databases 150) and new data module 234 receives new data from a plurality of input databases (e.g., input database 140) (e.g., again including a respective hardware component identifier and a respective associated value). Hardware component service 130 may generate a synthesized set of data by identifying a second subset of data from the historical data. Training data may be generated using the synthesized set.

Hardware component module 130 may generate the synthesized set of data by segmenting the historical and new data into any number of segments. In an embodiment, a first subset of the combined new and historical data may be identified that is associated with an anomaly. Anomalies may be identified in any manner described in the foregoing. As an example, in an embodiment, hardware component module 130 may input the new data and the historical data into an unsupervised machine learning model, and may receive as output from the unsupervised machine learning model an indication of outlier data (e.g., data that is a threshold distance from any given cluster produced by a clustering model). Hardware component module 130 may assign the outlier data to be part of the first subset of data.

A second subset of the combined new and historical data may be identified that is associated with an attenuation signal. Attenuation signals and entries associated with attenuation signals are subjects that are described in the foregoing and apply equally here. As an example, in an embodiment, hardware component module 130 may identify, from the historical data and the new data, stale data that is dated at least a minimum threshold amount of time from a present time, and may assign the stale data to be part of the second subset of data. In such an embodiment, weighting (e.g., performed by weighting module 232) may weight each entry of the second subset of data based on its respective attenuation signal in a manner that is inversely proportional to a respective amount of time from a present time from a date of the respective entry. A third subset of the combined new and historical data may be identified that includes the remaining data not identified for the first or second subsets.

Hardware component module 130 may update the synthesized set of data by discarding (or weighting to 0) the first subset of data from the synthesized set of data, and by weighting (e.g., using weighting module 232) the second subset of data based on its respective attenuation signal. Where the term "discarding" is used herein, this may refer to either deleting data, or to archiving the data The third subset of data may be not subjected to weighting. Advantageously, this saves on processing power relative to the prior-described embodiment in that weighting, which may be processing-intensive, is only applied to a subset of data, thus improving on processing, memory, and power parameters. Training module 233 may then use the synthesized set of data to train a database generation model, which may be used to generate a searchable database using searchable database generation module 235, with which queries may be processed by search module 237 and/or matching module 238 according to the foregoing.

Figure 3:
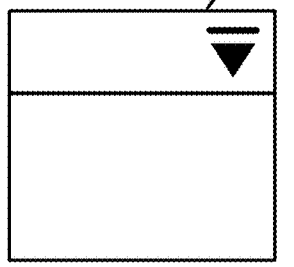
FIG. 3 illustrates one embodiment of a user interface showing exemplary manners of searching for hardware components and receiving results.

FIG. 3 illustrates one embodiment of a user interface showing exemplary manners of searching for hardware components and receiving results. As depicted in FIG. 3, user interface 300 may include search tool 310 and/or results 320. While depicted together, these may be shown in separate screens. Search tool 310 accepts one or more hardware component identifiers. Optionally, search tool 310 may accept additional parameters (e.g., a value, where the person submitting the query is seeking to provide a hardware component). While depicted as a drop-down menu, search tool 310 may accept a hardware component identifier in any known manner (e.g., free text, drop-down, and so on). There may be many ways to identify a hardware component, and any known mechanism may be input (e.g., scan QR code or bar code using a camera sensor, manually input a serial number, inputting a name, and so on).

Results 320 may include any data corresponding to a given hardware component identifier. Hardware component source 321 is a source from which a hardware component may be obtained. Value 322 is a value corresponding to the hardware component identifier as determined using the trained database generation model. Confidence score 323 is a confidence value by the trained database generation model as determined based on variance in the training data. The rotability determination 324 is an indicator (e.g., text, image, and/or video) that indicates a determination of whether the hardware component associated with the identifier is rotable or consumable. The rotability determination 324 may be generated by the rotability determination module 260 (e.g., previous or responsive to receiving the query) and stored in a searchable database. In some embodiments, the rotability determination 324 additionally includes a confidence score for the determination (e.g., also generated by rotability determination module 260 and stored in a searchable database). Any other data corresponding to a given hardware component may be included in results 320 (e.g., availability data, lead time to acquire, etc.).

Exemplary Particulars of Rotability Determination Module

Figure 4:
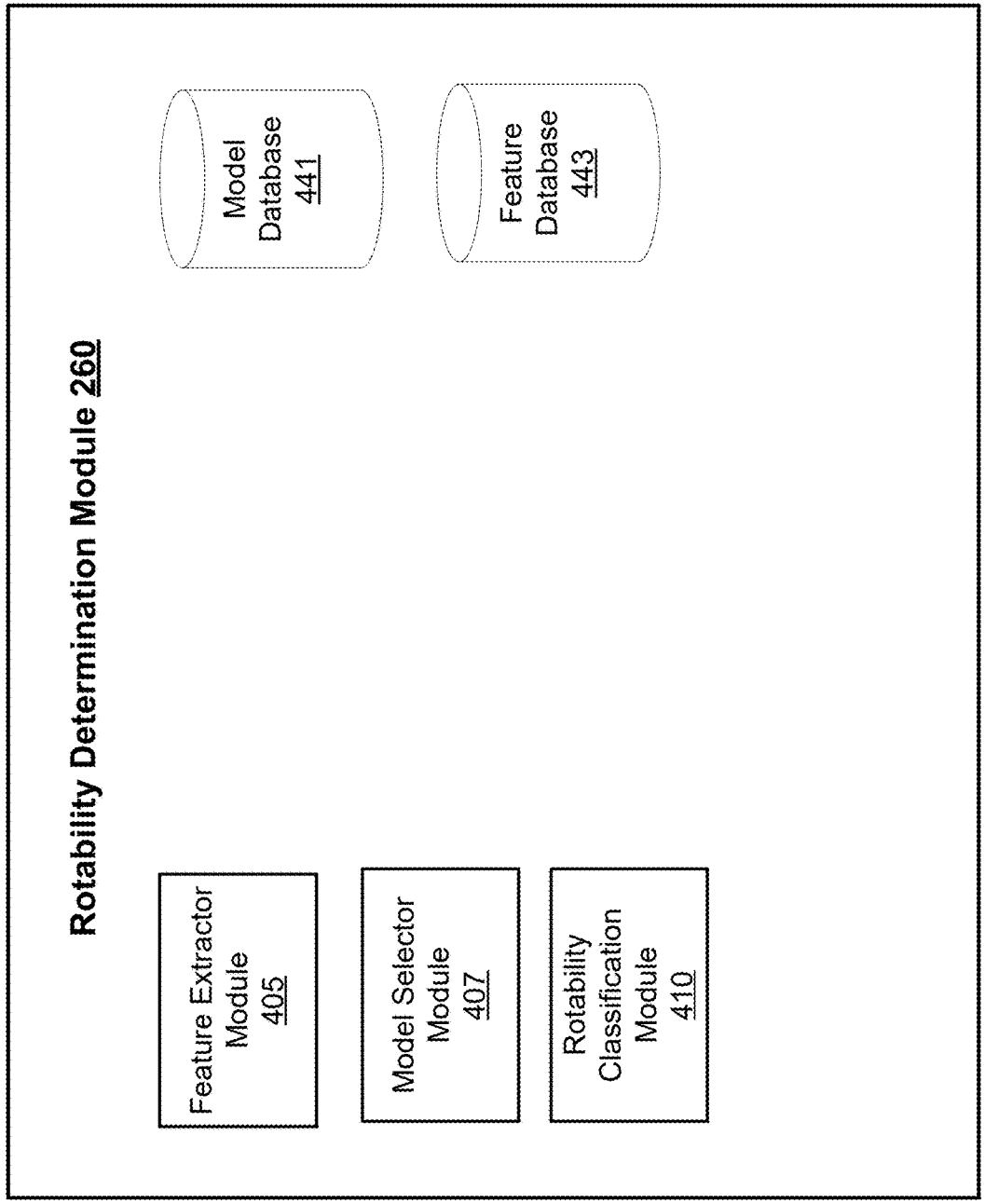
FIG. 4 illustrates one embodiment of exemplary modules and databases used by the rotability determination module.

FIG. 4 illustrates one embodiment of exemplary modules and databases used by the rotability determination module 260. As depicted in FIG. 4, rotability determination module 260 includes feature extractor module 405, model selector module 407, rotability classification module 410, model database 441, and feature database 443. The modules and databases depicted in FIG. 4 are merely exemplary; fewer or more modules and/or databases may be used to achieve the functionality described herein. Moreover, some or all functionality of hardware component service 130 may be distributed and/or instantiated at client device 110 (e.g., on application 111), at one or more of the source databases 150, at input database 140, or any combination thereof.

The feature extractor module 405 extracts rotable features for hardware components of an aircraft. As used herein, a rotable feature (or just "feature") for a hardware component may refer to structured data that can be used by a (e.g., machine learned) model to generate a rotable determination for that component. For a given hardware component, feature extractor module 405 may extract as many features as possible given the available data (e.g., in the source databases 150) for that hardware component. However, due to limited and inconsistent data availability for different hardware components, feature extractor module 405 may extract different sets of features for different components. For example, for a first component, there may be a large amount of available data such that the feature extractor module 405 can extract many features for the first component. However, for a second component, there may be less data available such that the feature extractor module 405 can generate only a few features (e.g., only one) for the second component.

To extract a feature, feature extractor module 405 receives data (e.g., via a retrieval process) associated with a hardware component and formats and/or structures that raw data into a feature (which can be input into a model). For example, feature extractor module 405 receives raw data, reformats the data, and vectorizes the reformatted data. Examples of formatting, structuring, and vectorizing raw data to form features are described below with respect to the example features. In some embodiments, feature extractor module 405 retrieves data from databases (e.g., 150) depending on the hardware component. This has the technical advantage of increasing search efficiency as opposed to searching every available database for data on every component, (which may result in feature extractor module 405 searching irrelevant resources for information on a component).

Feature extractor module 405 can receive hardware component data from any number of databases (e.g., source databases 150). Feature extractor module 405 may identify source databases 150 through any known means, such as scraping web data having references to known hardware components. The references to known hardware components may be any identifying feature of a hardware component, such as a name, model number, serial number, or any other identifier. Example data that may be extracted and converted into features by feature extractor module 405 is described below with respect to the example features. In some embodiments, feature extractor module 405 and historical data retrieval module 231 share functionalities, form a single module, or are the same module.

Example rotable features include text description features, condition code features, exchange indicator features, value features, classification code features, and component prefix features. These features are further described in the following paragraphs.

Text Description Feature. Text description data for a hardware component provides a description of the hardware component. A text description may be useful for making a rotability determination because the descriptions may: (a) directly state whether a component is rotable or consumable, (b) imply whether a component is rotable or consumable, (c) include language or a phraseology that can be correlated with rotability, or (d) any combination thereof.

Text description data for a hardware may be taken from any number of databases (e.g., source databases 150). For example, a database includes a hardware component catalog, and/or listings of hardware components for sale (e.g., from a manufacturer's website or a reseller's website).

If there are multiple sources (e.g., 150) with text descriptions for a component, those multiple may be combined (e.g., concatenated). The text may be normalized (e.g., removal of stop words, lemmatization, stemming, removal or modification of specific alphanumeric characters or patterns, or any combination thereof). The resulting data may then be vectorized to form a text description feature. In some embodiments, the resulting data is further processed before being vectorized. For example, the frequency of terms is analyzed and the resulting output is then vectorized. For example, a TF-IDF (term frequency-inverse document frequency model converts the resulting data into a numerical format by evaluating the relevance of each term or phrase in the text, where the relevance of each term or phrase increases proportionally to the number of times the term or phrase appears in the text. This conversion results in a text description feature, where each element (e.g., term or phrase) is represented by a TF-IDF score that indicates the relevance.

Condition Code Feature. A condition code for a hardware component indicates the condition of the component. Example conditions include: "new" (example code: "N"), "serviceable" (example code: "SV"), "overhaul" (example code "OH"), and "as removed" (example code: "AR"). Serviceable indicates the hardware component should be serviced before being installed on an aircraft (e.g., the component is damaged or broken). Overhaul indicates that the hardware component has been repaired, tested, and can be installed on an aircraft. As removed indicates that the component was removed from an aircraft and the condition of the component is the same as it was when it was removed from the aircraft. A condition code may be useful for making a rotability determination because a condition code may indicate whether a component is rotable or consumable. For example, if a hardware component has (or can have) the condition of serviceable or overhaul, this strongly indicates the component is rotable. Similarly, if a hardware component cannot have the condition of serviceable or overhaul, this indicates the component is consumable. To form a condition code feature, feature extractor module 405 may convert a condition code into a vector.

Condition codes specified for specific hardware components and condition codes that are possible for hardware components may be taken from any number of databases (e.g., source databases 150). For example, a database may include listings of hardware components for sale (e.g., from a manufacturer's website or a reseller's website).

Exchange Indicator Feature. The exchange indicator for a hardware component indicates whether the component can be exchanged (e.g., replaced) with another hardware component. More specifically, the exchange indicator indicates whether usable versions (e.g., new versions) of the hardware component are commonly sold by hardware component sellers in exchange for used or worn-out versions of the same hardware component (e.g., that were removed from aircraft). In an exchange, the value of a used or worn-out component may be discounted from the value of the usable version (e.g., new) of the component. If a hardware component is commonly exchanged, this may indicate the used or worn-out components are being serviced and re-sold for use on aircraft, thus suggesting the component is rotable. Example values for an exchange indicator include "true" or "1" if the component is exchangeable and "false" or "0" if the component is not exchangeable).

An exchange indicator for a hardware component may be taken from one or more databases (e.g., one or more source databases 150). For example, a part description (e.g., from a hardware component catalog) states the hardware component is exchangeable. However, an explicit exchange indicator may be uncommon. An exchange indicator for a hardware component may also be generated based on data for the component (e.g., taking from one or more source databases 150). For example, text descriptions of a hardware component can be analyzed. For example, feature extractor module 405 searches text description data for a list of words and phrases that each indicate whether the part is exchangeable (e.g., the list includes synonyms and permutations for the word "exchange"). If the text description includes one or more words or phrases that indicate the part is exchangeable, then the exchange indicator indicates the component is exchangeable. Similarly, if the text description does not indicate the part is exchangeable, or the text description includes one or more words or phrases that indicate the part is not exchangeable, then the exchange indicator indicates the component is not exchangeable. To generate an exchange indicator feature, feature extractor module 405 may convert the exchange indicator into a vector.

Value Feature. Value data for a hardware component indicates a value of the component. A value may be based on the condition of the component (e.g., the condition code). A value may indicate whether a component is rotable or consumable. For example, rotable components may generally have higher values than consumable components. The value for a component at a given condition may provide a stronger indication of rotability. For example, if the value of an overhauled component is above a predetermined threshold value, the component may be likely rotable. To generate a value feature for a component, feature extractor module 405 may convert a value into a vector. The vector may indicate the condition of the component as well (e.g., a condition code).

Determining the value of a hardware component was previously described with respect to the modules and databases in FIG. 2. For example, the value of a hardware component be determined by using the database generation model or searching (via the search module 237) a searchable database generated by searchable database generation module 236. The value of a component may be the result of a statistical calculation e.g., the average value of the component (e.g., over a threshold time period).

Classification code Feature. A classification code for a hardware component classifies the component into a group or category. An entity may generate and apply classification codes to hardware components based on attributes and/or uses of the components, where each code represents a group. Classification codes may be correlated with rotability even if the entity that assigned the codes to hardware components did not consider rotability when assigning the codes. For example, hardware components assigned to a certain classification code may have a 90% likelihood of being rotable. The correlation between classification codes and rotability may be determined e.g., via machine learning or data visualization techniques. To generate a classification code feature for a component, feature extractor module 405 may convert a classification code into a vector.

Classification codes may be taken from any number of databases (e.g., source databases 150). For example, a database may include a list of classification codes (mapped to hardware components) retrieved from a hardware component catalog or from a manufacturer's website.

Component Prefix Feature. Hardware components are assigned (e.g., unique) identification part numbers that may include alphanumeric characters (e.g., a serial number). A component prefix of a hardware component refers to a threshold number of the first characters of the part number for that component. The prefix of a hardware component may be correlated with the rotability of that component. The correlation may be determined using, for example, via machine learning or data visualization techniques. To generate a component prefix feature for a component, feature extractor module 405 may convert the prefix into a vector.

Features extracted by feature extractor module 405 may be stored in feature database 443.

Model database 441 can store rotability models. A rotability model can use one or more features to generate a rotability determination. A rotability model may also generate a confidence score indicating the accuracy of the determination (e.g., a probability indicating the rotability determination is correct).

A rotability model may be part of an ensemble model. An ensemble model includes multiple rotability models used in conjunction to generate a final rotability determination. An ensemble model may include individual rotability models that use different combinations of features to generate rotability determinations. As further described with respect to the rotability classification module 410 and FIG. 5, an ensemble model includes rotability classification module 410 that can receive rotability determinations from the individual rotability models and can generate a final rotability determination based on the rotability determinations. The final rotability determination may be output by rotability determination module 260.

Among other advantages, an ensemble model enables rotability determination module 260 to generate rotability determinations for a large number of hardware components despite limited and inconsistent data availability for the individual hardware components. For example, even if feature extractor module 405 is able to extract only a few features for a given hardware component (due to limited availability of data on the component), the use of an ensemble model enables generation of a rotability determination for that component. Furthermore, an ensemble model may have a better predictive performance than any of the individual rotability models used alone.

Example rotability models are described below. Each rotability model described below may be a machine learned model, a heuristic model, a model with custom logic, or any combination thereof. To generate a model, the correlation between the input feature(s) and a rotability determination may be determined using machine learning or data visualization techniques for known rotable and consumable hardware components. If a rotability model is machine learned, example training methods include random forest and logistic regression. The type of training may be based on which training results in better predictive performance. Training data for a machine learned model may be generated for known rotable and consumable hardware components by labeling a set of one or more features of the component with the known rotability classification (in other words, the label of the known rotability classification is treated as ground truth).

As previously mentioned, the number of known rotable and consumable hardware components is small compared to the total number of hardware components. Knowledge of known rotable and consumable hardware components may be ascertained from industry experts. To increase knowledge rotable and consumable hardware components (e.g., to increase the amount of training data for rotability models), components may be tracked on maintenance reports for aircraft. For example, if a hardware component (with a unique identification number) is removed from an aircraft but that same component (with the unique identification number) is later installed on another aircraft, this may indicate the component is rotable. Similarly, if a hardware component (with a unique identification number) is removed from an aircraft but not installed on another aircraft (e.g., after a threshold amount of time), this may indicate the component is consumable.

Prefix Model. The prefix model receives a component prefix feature as input and outputs a rotability determination. In some embodiments, a prefix model is trained using training data generated by labeling component prefix features for known rotable and consumable hardware components with the known rotability classifications. The prefix model may be generated using custom logic e.g., based on data visualizations. For example, a user reviews prefix features for known rotable and consumable hardware components (e.g., via a graph or plot), determines patterns from their observations, and encodes logic consistent with their determinations. In some embodiments, the prefix model is a machine learned model trained from training data that includes prefix features for known rotable and consumable hardware components labeled with known rotable determinations.

Text Model. The text model receives a text description feature as input and outputs a rotability determination. If the text model is a machine learned model, training data for the text model may include text description features for hardware components (that are known rotable and/or consumable hardware components (and optionally condition code features)) labeled with the known rotable determinations of those components. In embodiments where text description features include the results of a TF-IDF model (or another frequency analysis model), the text model may be a machine learning model trained to correlate TF-IDF scores of the text description features to rotability determinations.

Value Determination Model (also "value model"). The value model receives a value feature as input and outputs a rotability determination. In some embodiments, the value model receives a condition code feature (in addition to a value feature) to generate a rotability determination. The value determination model may be a logistical regression model. If the value determination model is a machine learned model, training data for the value determination model may include value features for hardware components (that are known rotable and/or consumable hardware components (and optionally condition code features)) labeled with the known rotable determinations of those components.

Classification Code Model. The classification code model receives a classification code feature as input and outputs a rotability determination. If the classification code model is a machine learned model, training data for the classification code model may include classification code features for hardware components (that are known rotable and/or consumable hardware components) labeled with known rotable determinations for those components.

Indicator model. The indicator model can receive a condition code feature and/or exchange indicator feature as input and output a rotability determination. Depending on the implementation, the indicator model may additionally, or alternatively, receive other features as input. The indicator model may be a random forest model. If the indicator model is a machine learned model, training data for the indicator model may include condition code features and/or exchange indicator features for hardware components (that are known rotable and/or consumable hardware components) labeled with known rotable determinations for those components.

The example rotability models described above are further described below with respect to FIG. 5.

The model selector module 407 receives (e.g., via a retrieval process) extracted features for a hardware component (e.g., from feature database 443 and/or feature extractor module 405). Model selector module 407 identifies, given the available features, rotability models (e.g., stored in model database 441) that can use one or more of the available features to generate rotability determinations. After the identification, the model selector module 407 provides the appropriate features to the corresponding models as input. For example, if the text description feature and the prefix feature are available for a given hardware component, the model selector module 407 may identify the text model and prefix model and then input the text description feature into the text model and input the prefix feature into the prefix model.

In some embodiments, model selector module 407 identifies every available rotability model that can use one or more of the available features for a given hardware component. In other embodiments, model selector module 407 limits its identification to rotability models in an ensemble model (or multiple ensemble models) that can use the available features. For example, if rotability determination module 260 is using an ensemble model that includes a subset of all the available rotability models (e.g., in model database 441), model selector module 407 may only identify rotability models in the subset that can use the available features for a given hardware component.

Figure 5:
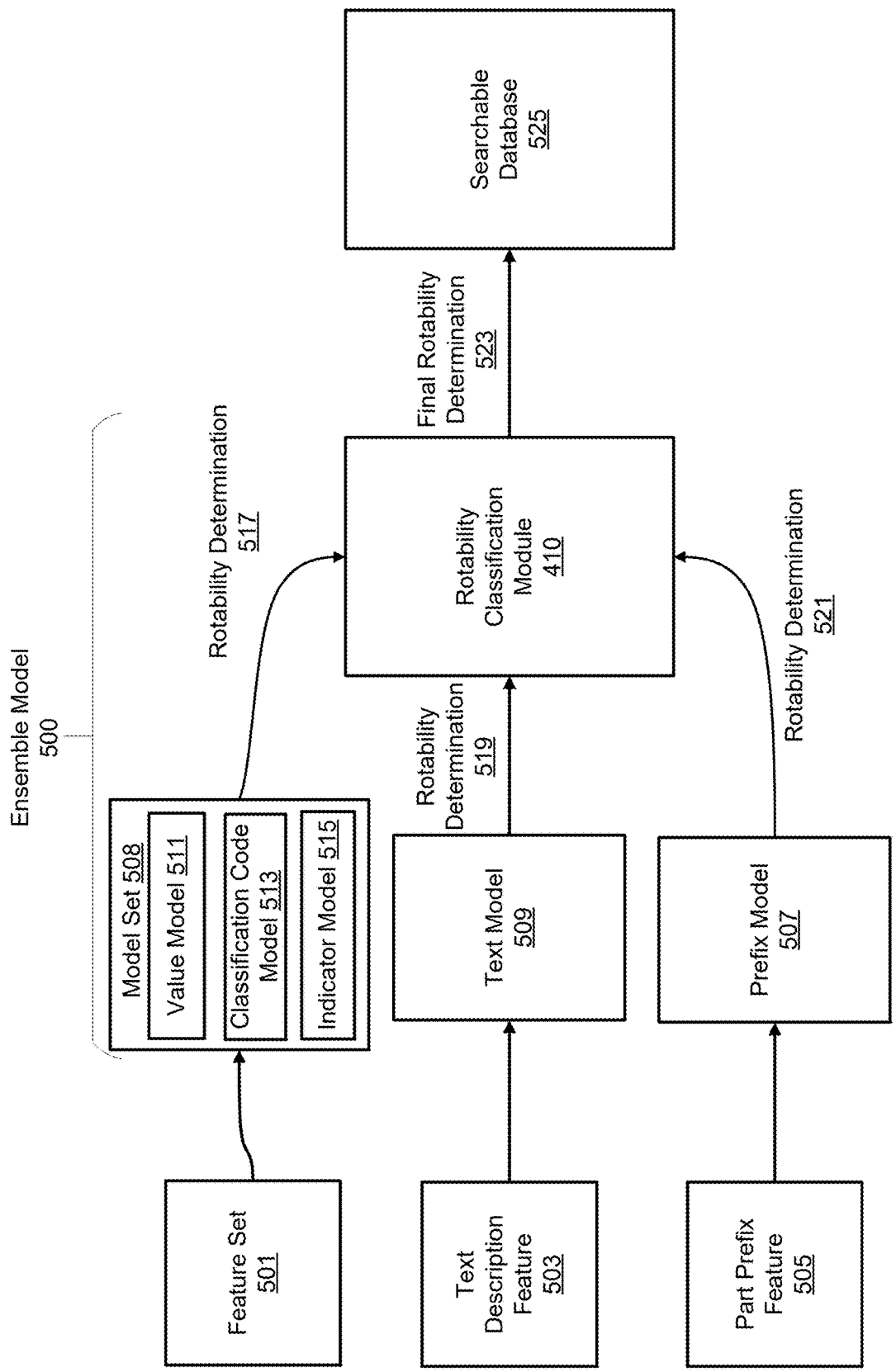
FIG. 5 is a diagram that illustrates the flow of inputs and outputs of an example ensemble model to generate a searchable database with a rotability determination for a hardware component.

In some embodiments, an ensemble model includes the selection of one or more models from a set of models (e.g., see model set 508 in FIG. 5). In these embodiments, model selector module 407 may select models in the set based on the available features. In some cases, model selector module 407 additionally selects the one or more models based on the models' reliability or historical performance. For example, use of the value model and the classification code model may be preferred over the indicator model.

The rotability classification module 410 receives one or more rotability determinations for a hardware component (from one or more rotability models) and determines a final rotability determination as output for rotability determination module 260. As used herein, a "final" rotability determination may refer to a rotability determination made by rotability classification module 410 and based on one or more rotability determinations (from one or more rotability models). A rotability determination from a rotability model may be referred to as an "initial" rotability determination. Rotability classification module 410 may also determine a confidence score for the final rotability determination (this may also be output for rotability determination module 260). For example, the confidence score is a probability indicating the rotability determination is correct.

Rotability classification module 410 may be a machine learned model, a heuristic model, a model with custom logic, or any combination thereof. Final rotability determinations may be based on the initial rotability determinations, confidence scores of the initial rotability determinations, reliability or historical performance of the models that generate the initial rotability determinations, or any combination thereof. In a first example, a final rotability determination corresponds to the initial rotability determination with the strongest (e.g., highest) confidence score. In a second example, rotability classification module 410 is a weighted sum model with an assigned weight for each rotability determination. Each weight may be based on the model that made the rotability determination (e.g., the reliability or historical performance of the model). In another example, each weight is related to a confidence score for the rotability determination (output by the model that generated the rotability determination).

In some embodiments, the rotability determination from a first rotability model with the lowest reliability or historical performance may be disregarded if a second rotability model (or multiple models) with a higher reliability or historical performance outputs a contradictory rotability determination (e.g., even if the confidence score from the first model is higher than the confidence score from the second model). For example, if the prefix model has a low historical performance score but the text model and the value model have high historical performance scores, the rotability determination from the prefix model (e.g., it determines the component is rotable) may be disregarded or ignored if the text model and the value model output contradictory determinations (e.g., both determine the component is consumable).

If initial rotability determinations contradict each other (e.g., two rotability determinations (e.g., with the same confidence scores) contradict each other), rotability classification module 410 may include custom logic to make a final determination. For example, in the case of a tie, rotability classification module 410 inspects one or more reliable features (e.g., the classification code feature or value feature) to determine the final determination.

Final rotability determinations from rotability classification module 410 are added to a searchable database that maps hardware components to their final rotability determinations. More specifically, for a given final rotability determination for a hardware component, a data structure for the hardware component with the final determination is added to a new or preexisting searchable database (e.g., a row or column is added to the searchable database table). For example, a searchable database is generated to include the data structure for the hardware component with the final determination. A searchable database with the data structures may be generated or modified by searchable database generation module 236.

In some embodiments, rotability determination module 260 can update (e.g., retrain) one or more rotability models and/or rotability classification module 410 based on feedback from users (e.g., via a retaining module). Feedback from a user may indicate whether a rotability determination (e.g., 324) is correct. For example, a user provides feedback by interacting with user interface 300 after a rotability determination 324 is displayed. If a threshold amount of feedback is received indicating a rotability determination (e.g., 324) is incorrect, rotability determination module 260 may update (e.g., retrain) rotability classification module 410 and/or one or more rotability models used to generate the final rotability determination. For example, the threshold amount of feedback may be used as ground truth data. Whether rotability classification module 410 and/or one or more rotability models are updated may depend on the arrangement of the ensemble model, the accuracy of the initial rotability determinations from the individual models, and/or how rotability classification module 410 made the final rotability determination.

Exemplary Flowchart Modules of Rotability Determination Module

FIG. 5 is a diagram that illustrates the flow of inputs and outputs of an example ensemble model 500 (of the rotability determination module 260) to generate a searchable database 525 with a final rotability determination 523 for a hardware component. Ensemble model 500 uses three models (however, an ensemble model may have additional or fewer models). The three models include the prefix model 507, the text model 509, and one model from model set 508 (however, an ensemble model may include additional, fewer, or different models). Model set 508 includes the value model 511, the classification code model 513, and the indicator model 515. Model selector module 407 may determine which model from model set 508 is used. For example, model selector module 407 selects the model based on the available features for the hardware component. If enough features are available that multiple models from the set may be used, model selector module 407 may select all models that can use the available features. Alternatively, model selector module 407 may select one of the models from the set e.g., based on model reliability or historical performance. For example, model selector module 407 may prefer the models in the following order: value model 511, classification code model 513, and indicator model 515 (e.g., based on model reliability or historical performance). In a more specific example, model selector module 407 checks if a value feature is available. If so, value model 511 is used. If not, model selector module 407 checks if a classification code feature is available. If so, classification code model 513 is used. If not, indicator model 515 is used.

Ensemble model 500 may be structured according to (e.g., typical) data availability for hardware components. In this example, component prefix features and text description features are available for many (e.g., all or most) hardware components, but other features are less available (e.g., the condition code, exchange indicator, value, and classification code features are inconsistently available for components). Thus, the third model may be selected from model set 508 for each hardware component according to which feature(s) are available for that component. However, if the typically data availability is different, then an ensemble model with a different arrangement and/or different models may be used.

On the left side, features are input into the models of ensemble model 500 (e.g., by model selector module 407). More specifically, a component prefix feature 505 for a hardware component is input into prefix model 507, a text description feature 503 for the hardware component is input into text model 509, and a feature set 501 (of one or more features) is input into the selected model from model set 508.

The three models each output initial rotability determinations (labeled 517, 519, and 521). The rotability determinations are input into rotability classification module 410. As previously described, rotability classification module 410 determines a final rotability determination (labeled as 523).

Final rotability determination 523 is added to a searchable database 525 that maps hardware components to their final rotability determinations. More specifically, a data structure for the hardware component with the final determination is added to a new or preexisting database. For example, searchable database 525 is generated to include the data structure for the hardware component with the final determination. Searchable database 525 may be generated or modified by searchable database generation module 236.

Computing Machine Architecture

Figure 6:
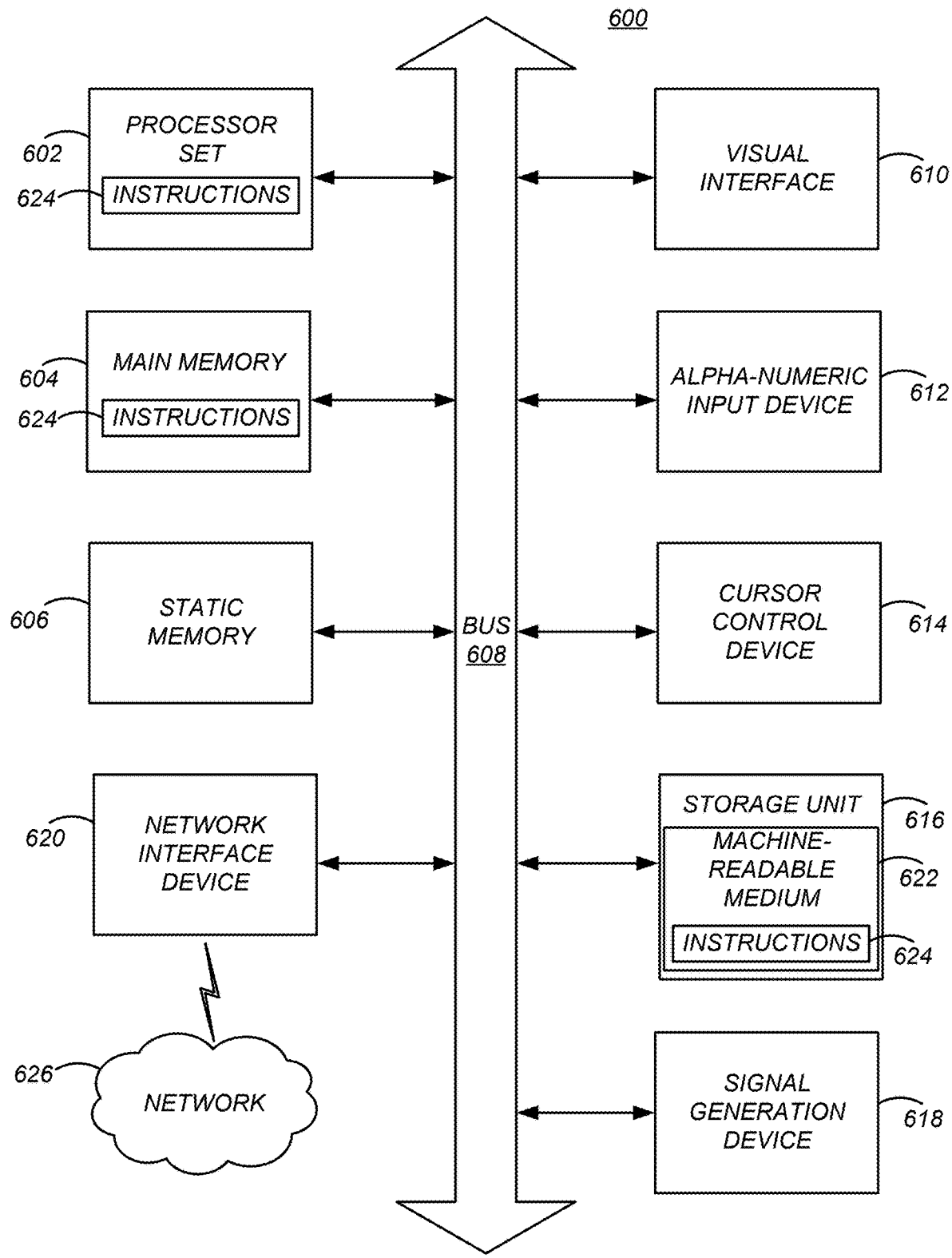
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a set of one or more processors (or controllers). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines (e.g., a database cluster and/or a server cluster) that individually or jointly execute instructions 624 to perform any one or more of the methodologies discussed herein.

The example computer system 600 includes a set of one or more processors 602 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any combination of these), a main memory 604, and a static memory 606, which are configured to communicate with each other via a bus 608. If the processor set 602 includes multiple processors, the processors may operate collectively or individually. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor set 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Exemplary Processes for Using Hardware Component Service

Figure 7:
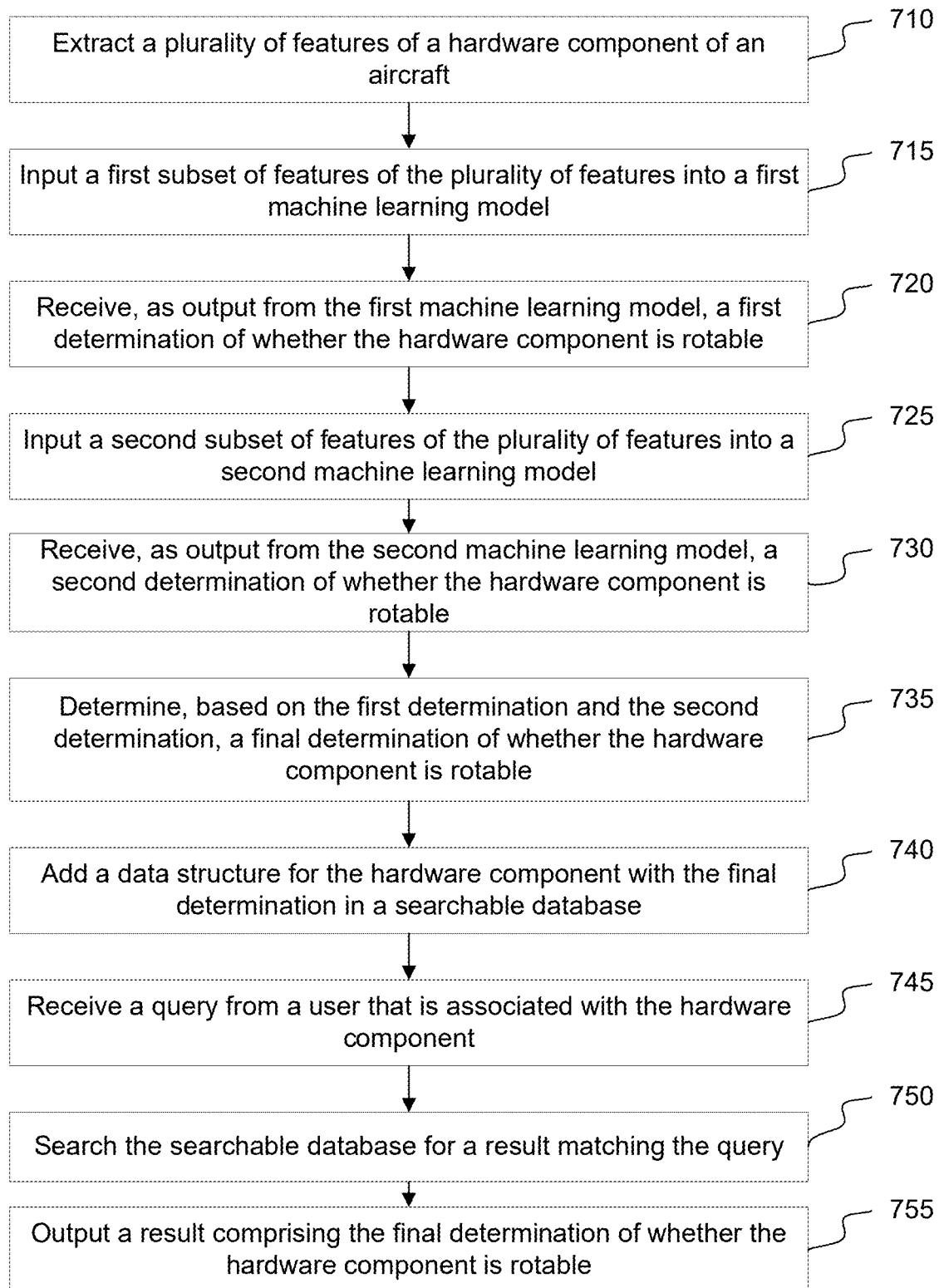
FIG. 7 is a is a flowchart of an example method for generating a rotability determination for a hardware component and for outputting the determination.

FIG. 7 is a flowchart of an example method for generating a rotability determination for a hardware component and for outputting the determination. In the example of FIG. 7, the method is performed by hardware component service 130. The method can include additional or fewer steps than described herein. Additionally, the steps can be performed in different order or by different components than described herein. In some embodiments, the method is performed by a computing system (e.g., 600) executing code stored on a (e.g., non-transitory) computer-readable storage medium that causes the computing system to perform the steps of the method of FIG. 7.

At step 710, hardware component service 130 (e.g., feature extractor module 405) extracts a plurality of features (e.g., 501, 503, 505) of a hardware component of an aircraft.

At step 715, hardware component service 130 (e.g., model selector module 407) inputs a first subset of one or more features of the plurality of features into a first machine learning model (e.g., 501 input into 511)

At step 720, hardware component service 130 (e.g., rotability classification module 410) receives, as output from the first machine learning model, a first determination of whether the hardware component is rotable (e.g., 517).

At step 725, hardware component service 130 (e.g., model selector module 407) inputs a second subset of one or more features of the plurality of features into a second machine learning model (e.g., 503 into 509).

At step 730, hardware component service 130 (e.g., rotability classification module 410) receives, as output from the second machine learning model, a second determination of whether the hardware component is rotable (e.g., 519).

At step 735, hardware component service 130 (e.g., rotability classification module 410) determines, based on the first determination and the second determination, a final determination of whether the hardware component is rotable (e.g., 523).

At step 740, hardware component service 130 (e.g., searchable database generation module 236) adds a data structure for the hardware component with the final determination in a searchable database (e.g., 525).

At step 745, hardware component service 130 (e.g., search module 237) receives a query from a user, where the query is associated with the hardware component. For example, see the description with respect to search module 237 and FIG. 3 and its description.

At step 750, hardware component service 130 (e.g., search module 237) searches the searchable database for a result matching the query. For example, see the description with respect to search module 237 and FIG. 3 and its description.

At step 755, hardware component service 130 (e.g., search module 237) outputs a result comprising the final determination of whether the hardware component is rotable (e.g., rotability determination 324). For example, see the description with respect to search module 237 and FIG. 3 and its description.

In some embodiments, hardware component service 130 (e.g., feature extractor module 405) extracting the plurality of features of the hardware component of the aircraft includes: searching a plurality of databases (e.g., source databases 150) for text corresponding to the hardware component; and transforming the text corresponding to the hardware component into at least some of the plurality of features.

The method may further include hardware component service 130 selecting the first machine learning model from a plurality of candidate first machine learning models by: determining whether the plurality of features comprises a classification (e.g., a classification code feature); and responsive to determining that the plurality of features does not comprise the classification, selecting the first machine learning model to be a value determination model (e.g., 511).

The second subset of features (e.g., 503) may be generated (e.g., by feature extractor module 405) by: searching a plurality of databases (e.g., source databases 150) for text corresponding to the hardware component, and concatenating the text from the plurality of databases into a vector; and where the second machine learning model (e.g., 509) at least partially bases the second determination on a frequency of terms within the vector. Generating the second subset of features may further include normalizing the text from the plurality of database for use in the vector.

The method may further include hardware component service 130 (e.g., model selector module 407) inputting a third subset of one or more features of the plurality of features into a third machine learning model (e.g., 505 into 507); and hardware component service 130 (e.g., rotability classification module 410) receiving, as output from the third machine learning model, a third determination of whether the hardware component is rotable (e.g., 521), where the final determination of whether the hardware component is rotable (e.g., 523) is further based on the third determination. The third subset of features may include one or more part number prefixes for the hardware component. The third machine learning model may be trained using training examples of given part number prefixes as labeled by whether a given part number prefix is rotable. In some embodiments, rotability classification module 410 determining the final determination (e.g., 523) comprises ignoring the third determination (e.g., 521) when the first determination (e.g., 519) and the second determination (e.g., 517) are consistent and factoring in the third determination when the first determination and the second determination are inconsistent.

Other aspects include components, devices, systems, improvements, methods, processes, applications, computer readable mediums, and other technologies related to any of the above.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. While hardware components described herein are generally referred to as "aircraft" components, the term aircraft is not intended to be limiting, and hardware components for any other item may be used instead.

What is claimed is:

1. A method comprising:
   extracting a plurality of features of a hardware component of an aircraft;
   inputting a first subset of features of the plurality of features into a first machine learning model;
   receiving, as output from the first machine learning model, a first determination of whether the hardware component is rotable;
   inputting a second subset of features of the plurality of features into a second machine learning model;
   receiving, as output from the second machine learning model, a second determination of whether the hardware component is rotable;
   determining, based on the first determination and the second determination, a final determination of whether the hardware component is rotable;
   adding a data structure for the hardware component with the final determination in a searchable database;
   receiving a query from a user that is associated with the hardware component;
   searching the searchable database for a result matching the query; and
   outputting the result matching the query, the result matching the query comprising the final determination of whether the hardware component is rotable.

2. The method of claim 1, wherein extracting the plurality of features of the hardware component of the aircraft comprises:
   searching a plurality of databases for text corresponding to the hardware component; and
   transforming the text corresponding to the hardware component into at least some of the plurality of features.

3. The method of claim 1, further comprising selecting the first machine learning model from a plurality of candidate first machine learning models by:
   determining whether the plurality of features comprises a classification; and
   responsive to determining that the plurality of features does not comprise the classification, selecting the first machine learning model to be a value determination model.

4. The method of claim 1, wherein the second subset of features is generated by:
   searching a plurality of databases for text corresponding to the hardware component, and
   concatenating the text from the plurality of databases into a vector; and wherein the second machine learning model at least partially bases the second determination on a frequency of terms within the vector.

5. The method of claim 4, wherein the second subset of features is further generated by normalizing the text from the plurality of databases for use in the vector.

6. The method of claim 1, further comprising:
   inputting a third subset of features of the plurality of features into a third machine learning model; and
   receiving, as output from the third machine learning model, a third determination of whether the hardware component is rotable, wherein the final determination of whether the hardware component is rotable is further based on the third determination.

7. The method of claim 6, wherein the third subset of features comprises one or more part number prefixes for the hardware component, and wherein the third machine learning model is trained using training examples of given part number prefixes as labeled by whether a given part number prefix is rotable.

8. The method of claim 6, wherein determining the final determination comprises ignoring the third determination when the first determination and the second determination are consistent and factoring in the third determination when the first determination and the second determination are inconsistent.

9. A non-transitory computer-readable medium comprising memory with instructions encoded thereon that, when executed, cause one or more processors to perform operations, the instructions comprising instructions to:
   extract a plurality of features of a hardware component of an aircraft;
   input a first subset of features of the plurality of features into a first machine learning model;
   receive, as output from the first machine learning model, a first determination of whether the hardware component is rotable;
   input a second subset of features of the plurality of features into a second machine learning model;
   receive, as output from the second machine learning model, a second determination of whether the hardware component is rotable;

determine, based on the first determination and the second determination, a final determination of whether the hardware component is rotable;

add a data structure for the hardware component with the final determination in a searchable database;

receive a query from a user that is associated with the hardware component;

search the searchable database for a result matching the query; and output the result matching the query, the result matching the query comprising the final determination of whether the hardware component is rotable.

10. The non-transitory computer-readable medium of claim 9, wherein the instructions to extract the plurality of features of the hardware component of the aircraft comprise instructions to:

search a plurality of databases for text corresponding to the hardware component; and transform the text corresponding to the hardware component into at least some of the plurality of features.

11. The non-transitory computer-readable medium of claim 9, the instructions further comprising instructions to select the first machine learning model from a plurality of candidate first machine learning models by:

determining whether the plurality of features comprises a classification; and responsive to determining that the plurality of features does not comprise the classification, selecting the first machine learning model to be a value determination model.

12. The non-transitory computer-readable medium of claim 9, wherein the second subset of features is generated by:

searching a plurality of databases for text corresponding to the hardware component, and concatenating the text from the plurality of databases into a vector; and wherein the second machine learning model at least partially bases the second determination on a frequency of terms within the vector.

13. The non-transitory computer-readable medium of claim 12, the instructions further comprising instructions to normalize the text from the plurality of databases for use in the vector.

14. The non-transitory computer-readable medium of claim 9, the instructions further comprising instructions to:

input a third subset of features of the plurality of features into a third machine learning model; and receive, as output from the second machine learning model, a third determination of whether the hardware component is rotable, wherein the final determination of whether the hardware component is rotable is further based on the third determination.

15. The non-transitory computer-readable medium of claim 14, wherein the third subset of features comprises one or more part number prefixes for the hardware component, and wherein the third machine learning model is trained using training examples of given part number prefixes as labeled by whether a given part number prefix is rotable.

16. The non-transitory computer-readable medium of claim 14, wherein the instructions to determine the final determination comprise instructions to ignore the third determination when the first determination and the second determination are consistent and factoring in the third determination when the first determination and the second determination are inconsistent.

17. A system comprising:

memory with instructions encoded thereon; and one or more processors that, when executing the instructions, are caused to perform operations comprising:

extracting a plurality of features of a hardware component of an aircraft;

inputting a first subset of features of the plurality of features into a first machine learning model;

receiving, as output from the first machine learning model, a first determination of whether the hardware component is rotable;

inputting a second subset of features of the plurality of features into a second machine learning model;

receiving, as output from the second machine learning model, a second determination of whether the hardware component is rotable;

determining, based on the first determination and the second determination, a final determination of whether the hardware component is rotable;

adding a data structure for the hardware component with the final determination in a searchable database;

receiving a query from a user that is associated with the hardware component;

searching the searchable database for a result matching the query; and outputting the result matching the query, the result matching the query comprising the final determination of whether the hardware component is rotable.

18. The system of claim 17, wherein extracting the plurality of features of the hardware component of the aircraft comprises:

searching a plurality of databases for text corresponding to the hardware component; and transforming the text corresponding to the hardware component into at least some of the plurality of features.

19. The system of claim 17, the operations further comprising selecting the first machine learning model from a plurality of candidate first machine learning models by:

determining whether the plurality of features comprises a classification; and responsive to determining that the plurality of features does not comprise the classification, selecting the first machine learning model to be a value determination model.

20. The system of claim 17, wherein the second subset of features is generated by:

searching a plurality of databases for text corresponding to the hardware component, and concatenating the text from the plurality of databases into a vector; and wherein the second machine learning model at least partially bases the second determination on a frequency of terms within the vector.

* * * * *